UNITED STATES PATENT OFFICE.

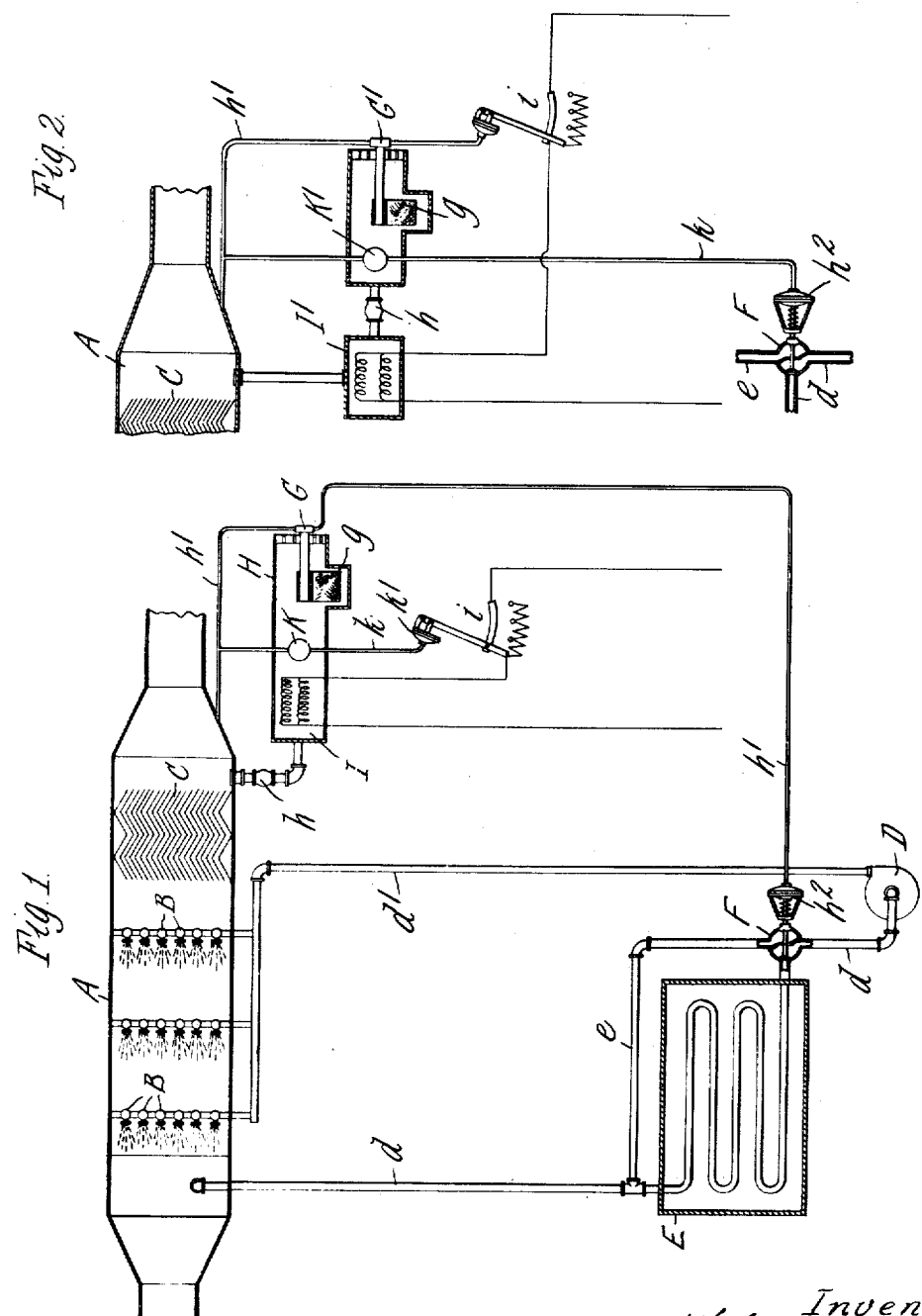

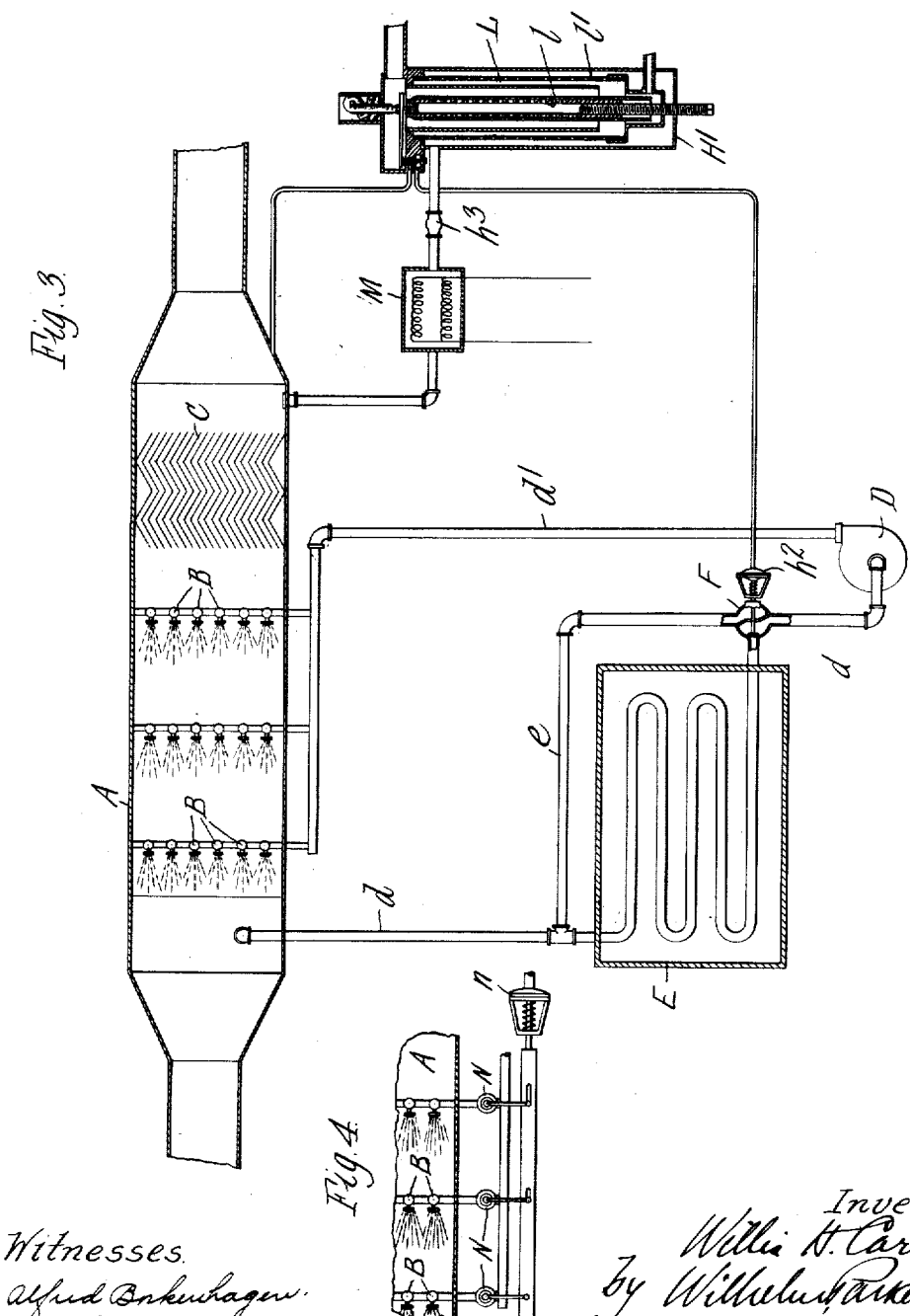

WILLIS H. CARRIER, OF BUFFALO, NEW YORK, ASSIGNOR TO BUFFALO FORGE COMPANY, OF BUFFALO, NEW YORK.

METHOD OF CONTROLLING THE HUMIDITY OF AIR UNDER PRESSURE.

1,167,740. Specification of Letters Patent. Patented Jan. 11, 1916.

Application filed August 21, 1911. Serial No. 645,089.

*To all whom it may concern:*

Be it known that I, WILLIS H. CARRIER, a citizen of the United States, residing at Buffalo, in the county of Erie and State of New York, have invented a new and useful Improvement in Methods of Controlling the Humidity of Air Under Pressure, of which the following is a specification.

This invention relates to a method of controlling the humidity of air, or other gas under pressure, and more particularly to a method of regulating the humidity of compressed air for use in metallurgical processes.

In the operation of metallurgical furnaces the pressure of the blast must be increased or decreased in accordance with variations in resistance in the furnace, but the air should contain a substantially constant weight of water vapor per unit of weight of the air in order to insure uniformity in the product.

The primary object of this invention is to produce a practical and economical method, adapted for use in connection with metallurgical processes, by which air under variable pressure can be conditioned so that it will contain a predetermined definite amount of water vapor per pound of air, or per cubic foot of free air.

The method of controlling the humidity of the air is hereinafter explained in connection with the operation of the apparatus for performing the same.

In the accompanying drawings consisting of two sheets: Figure 1 is a diagrammatical plan view of one form of apparatus for carrying on the method embodying the invention. Fig. 2 shows a slightly different arrangement of the controlling devices. Fig. 3 is a view similar to Fig. 1 of a modified apparatus for effecting the control. Fig. 4 is a diagrammatic view of means for regulating the humidity by varying the supply of the cooling liquid to the cooling or spray chamber.

Like reference characters refer to like parts in the several figures.

A represents a cooling and condensing or spray chamber of any suitable form and construction through which the air passes from the compressor to the furnace. The air is cooled in this chamber to condense the surplus water vapor and reduce the moisture contents of the air to a desired amount, by water or other cooling liquid discharged into the chamber A by spray nozzles B, or by other suitable means, and then passes through an eliminator C of any suitable sort which separates the free moisture from the air.

The temperature and the pressure of the compressed air fluctuates and the temperature in the cooling or spray chamber must be lowered more or less to cool the air to the required degree, depending upon the desired moisture contents. This can be done in various ways, for instance by regulating the temperature or the quantity of the cooling liquid. In the apparatus shown in Fig. 1 the temperature of the cooling liquid is automatically regulated. A pump D draws the cooling liquid from the bottom of the cooling chamber through a pipe $d$ and delivers it by a pipe $d'$ to the spray nozzles.

E represents a liquid cooler of any suitable kind.

$e$ is a by-pass pipe around the cooler and F is a mixing valve controlling the pipe $d$ and the by-pass $e$. The mixing valve F is controlled by a thermostat G and automatically regulates the temperature of the cooling liquid by causing more or less of the liquid to flow through the cooler or through the by-pass. The thermostat is covered by a wet wick $g$, or otherwise constructed, so that its action is responsive to the wet bulb temperature of the surrounding air, and it is located in a chamber or casing H to which air is admitted substantially at atmospheric pressure from the cooling or spray chamber A by a pressure reducing valve or restriction $h$. The thermostat may be of any suitable construction and may control the mixing valve F through any suitable instrumentality, for instance, by regulating the pressure of air in a pipe $h'$ leading from the cooling or spray chamber A to the actuating diaphragm or motor $h^2$ of the mixing valve.

I represents a heater adapted to regulate the temperature of the air admitted to the thermostat chamber H so as to maintain substantially a predetermined temperature in said chamber. An electric heater is shown provided with a rheostat $i$ for regulating its temperature. A thermostat K of any suitable sort controls the position of the movable arm of the rheostat, for instance, by regulating the pressure of air in a pipe $k$ leading from the cooling or spray chamber to the actuating diaphragm or motor $k'$ of the rheostat. This thermostat K is subjected to the actual or dry bulb temperature of the air after passing the heater I and can be set to maintain the required predetermined temperature in the thermostat chamber H.

Since the air in the thermostat chamber is maintained substantially at a constant temperature and at atmospheric pressure, there will be no change in the wet bulb thermostat so long as the air contains the number of grains of water vapor per cubic foot of free air for which the apparatus is adjusted. If the moisture contents of the air in the thermostat chamber increase or decrease the wet bulb thermostat G, acting through the mixing valve F, will alter the temperature of the cooling liquid and thereby regulate the temperature in the cooling or spray chamber as required to insure the predetermined amount of moisture per cubic foot of the free air in the thermostat chamber H. Thus the temperature in the cooling or spray chamber is automatically regulated as required to bring the compressed air, the temperature of which varies with variations in its pressure, to a temperature such that it can contain only the weight of water vapor per cubic foot of free air which the apparatus is set to maintain. By adjusting the thermostats G and K to maintain the appropriate difference between the wet and dry bulb temperatures of the free air in the thermostat chamber compressed air can be obtained having any required weight of water vapor per unit of weight of the air. While the apparatus is ordinarily used for reducing the humidity of the air to the required amount by a cooling liquid, as explained, the humidity could be increased to a predetermined amount in the same way by appropriately regulating the temperature of the spray liquids. The amount of air which must be passed through the reducing valve to obtain the above described regulation is relatively insignificant.

The heater I can be located either, as shown in Fig. 1, in the thermostat chamber H to heat the air after passing the pressure reducing valve, or it can be arranged in advance of the pressure reducing valve, as shown at I' in Fig. 2. The thermostats can also be reversed, as shown in Fig. 2, so that the wet bulb thermostat G' controls the rheostat $i$ and the dry bulb thermostat K' controls the mixing valve F. With either arrangement a predetermined difference between the wet and dry bulb temperature of the air corresponding to the required dew point can be maintained.

Fig. 3 illustrates a slightly modified apparatus for effecting a similar control of the dew point of air under variable pressures. In this apparatus the air cooling and condensing, or spraying, and liquid circulating and tempering means are the same as before described, but the regulation is effected by a differential hygrostat L arranged in a thermostat chamber or casing H' through which air from the cooling or spray chamber A passes after being reduced substantially to atmospheric pressure by a pressure reducing valve $h^3$. This hygrostat may be of any suitable construction having wet and dry bulb expansible members $l$ and $l'$ and adapted to be adjusted to maintain the predetermined relation between the wet and dry bulb temperatures of the air which will give approximately a constant dew point at atmospheric pressure. For instance, the hygrostat may be of the construction shown either in the Patent No. 896,690, granted Aug. 18, 1908, to Willis H. Carrier, assignor, or in Patent No. 929,655, granted Aug. 3, 1909, to Carrier and Comfort, assignors.

A heater M of any suitable kind is shown for heating the free air passing to the hygrostat. This heater is only used when the temperature of the air is below the freezing point.

Either of the apparatus described can be so adjusted as to maintain the predetermined relation between the wet and dry bulb temperatures which will give approximately a constant dew point at atmospheric pressure under the variable temperature range which will exist when operating under variable pressures.

Fig. 4 illustrates means for controlling the temperature in the cooling or spray chamber A, by increasing or decreasing the quantity of the liquid sprayed into the cooling or spray chamber, instead of regulating the temperature thereof, as before described. In this figure N represents valves adapted to be operated by a diaphragm or motor $n$, so as to turn or shut off the liquid from one group or spray nozzles after another. The temperature of the compressed air can be regulated in this way in either apparatus above described, the valve actuating diaphragm or motor being controlled in the same way as the diaphragm of the mixing valve in said apparatus.

I claim as my invention:

1. The herein described method of controlling the humidity of air under pressure, consisting in reducing the pressure of a portion of said air substantially to atmospheric pressure and so regulating the temperature of said compressed air under the control of said air of reduced pressure as to maintain substantially a predetermined relation between the wet and dry bulb temperatures of said air of reduced pressure, substantially as set forth.

2. The herein described method of controlling the humidity of air under variable pressures, consisting in cooling said air to condense water vapor therefrom, reducing the pressure of a portion of said air after cooling substantially to atmospheric pressure, and so regulating the temperature to which said compressed air is cooled under the control of said air of reduced pressure as to maintain substantially a predetermined relation between the wet and dry bulb temperatures of said air of reduced pressure, substantially as set forth.

3. The herein described method of controlling the humidity of air under variable pressures, consisting in cooling said air by means of a cooling liquid to condense water vapor therefrom, reducing the pressure of a portion of said air after cooling substantially to atmospheric pressure, and so regulating the cooling effect of said cooling liquid under the control of said air of reduced pressure as to maintain substantially a predetermined relation between the wet and dry bulb temperatures of said air of reduced pressure, substantially as set forth.

4. The herein described method of controlling the humidity of air under variable pressures, consisting in spraying a liquid into said air to alter the temperature and humidity thereof, separating the free moisture from the air, thereafter reducing the pressure of a portion of said air substantially to atmospheric pressure, and so regulating the temperature of said liquid under the control of said air of reduced pressure as to maintain substantially a predetermined relation between the wet and dry bulb temperatures of said air of reduced pressure, substantially as set forth.

5. The herein described method of controlling the humidity of air under variable pressures, consisting in cooling said air by means of a cooling liquid to condense water vapor therefrom, reducing the pressure of a portion of said air after cooling substantially to atmospheric pressure, and regulating the temperature of said cooling liquid through the medium of the coöperation of the separate effects of the wet and dry bulb temperatures of said air of reduced pressure, substantially as set forth.

6. The herein described method of controlling the humidity of air under variable pressures, consisting in spraying a cooling liquid into said air to condense water vapor therefrom, separating the free moisture from the air, reducing the pressure of a portion of said air after cooling substantially to atmospheric pressure, maintaining substantially a predetermined temperature of said air of reduced pressure, and regulating the cooling effect of said cooling liquid under the control of the wet bulb temperature of said air of reduced pressure, substantially as set forth.

7. The herein described method of controlling the humidity of air under variable pressures, consisting in spraying a cooling liquid into said air to condense water vapor therefrom, separating the free moisture from the air, reducing the pressure of a portion of said air after cooling substantially to atmospheric pressure, heating said air of reduced pressure under the control of the temperature thereof to maintain substantially a predetermined temperature of said air of reduced pressure, and regulating the cooling effect of said cooling liquid under the control of the wet bulb temperature of said air of reduced pressure, substantially as set forth.

8. The herein described method of controlling the humidity of air under variable pressures, consisting in cooling said air to condense water vapor therefrom, reducing the pressure of a portion of said air after cooling substantially to atmospheric pressure and regulating the temperature to which said compressed air is cooled through the medium of the coöperation of the separate effects of the wet and dry bulb temperatures of said air of reduced pressure, substantially as set forth.

9. The herein described method of controlling the humidity of air under pressure, consisting in spraying a liquid into said air, reducing the pressure of a portion of said air after contact with said liquid substantially to atmospheric pressure, and so regulating the tempering effect of said liquid on the air under the control of said air of reduced pressure as to maintain substantially a predetermined relation between the wet and dry bulb temperatures of said air of reduced pressure, substantially as set forth.

10. The herein described method of controlling the humidity of air under variable pressures, consisting in diverting a portion of said air and maintaining a substantially constant pressure thereof, and so regulating the temperature of said compressed air under the control of said diverted portion of air as to maintain a substantially predetermined relation between the wet and dry bulb temperatures of said diverted portion of air, substantially as set forth.

11. The herein described method of controlling the humidity of air under variable pressures, consisting in reducing the pressure of a portion of said air substantially to atmospheric pressure and regulating the temperature of said compressed air under the control of the coöperation of the separate effects of the wet and dry bulb temperatures of said air of reduced pressure, substantially as set forth.

12. The herein described method of controlling the humidity of air under variable pressures, consisting in reducing the pressure of a portion of said air substantially to atmospheric pressure, maintaining substantially a constant temperature of said air of reduced pressure, and regulating the temperature of said compressed air under the control of the wet bulb temperature of said air of reduced pressure, substantially as set forth.

Witness my hand this 18th day of August, 1911.

WILLIS H. CARRIER.

Witnesses:
 H. C. RICE,
 CARLOS CEBRIAN.

It is hereby certified that in Letters Patent No. 1,167,740, granted January 11, 1916, upon the application of Willis H. Carrier, of Buffalo, New York, for an improvement in "Methods of Controlling the Humidity of Air Under Pressure," errors appear in the printed specification requiring correction as follows: Page 2, line 114, after the word "turn" insert the word *on;* same page, line 115, for the word "or," read *of;* and that the said Letters Patent should be read with these corrections therein that the same may conform to the record of the case in the Patent Office.

Signed and sealed this 15th day of February, A. D., 1916.

[SEAL.]

R. F. WHITEHEAD,
*Acting Commissioner of Patents.*

Cl. 98—39.